(12) United States Patent
Kim et al.

(10) Patent No.: US 9,715,045 B2
(45) Date of Patent: Jul. 25, 2017

(54) OPTICAL FILM INCLUDING FUNCTIONAL COATING LAYER AND POLARIZING PLATE AND IMAGE DISPLAY DEVICE INCLUDING SAME

(71) Applicant: LG CHEM, LTD., Seoul (KR)

(72) Inventors: Kyoung-Won Kim, Daejeon (KR); Nam-Jeong Lee, Daejeon (KR); Hwa-Sub Shim, Daejeon (KR); Jun-Wuk Park, Daejeon (KR); Yi-Rang Lim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/024,670

(22) PCT Filed: Sep. 26, 2014

(86) PCT No.: PCT/KR2014/009055
§ 371 (c)(1),
(2) Date: Mar. 24, 2016

(87) PCT Pub. No.: WO2015/046971
PCT Pub. Date: Apr. 2, 2015

(65) Prior Publication Data
US 2016/0238744 A1    Aug. 18, 2016

(30) Foreign Application Priority Data

Sep. 30, 2013  (KR) .......... 10-2013-0117064
Sep. 25, 2014  (KR) .......... 10-2014-0128311

(51) Int. Cl.
| | | |
|---|---|---|
| G02B 1/00 | (2006.01) | |
| G02B 1/16 | (2015.01) | |
| C08J 7/04 | (2006.01) | |
| G02F 1/1335 | (2006.01) | |
| G02B 5/30 | (2006.01) | |
| B32B 27/30 | (2006.01) | |
| C09D 5/24 | (2006.01) | |
| C09D 175/04 | (2006.01) | |
| B32B 7/12 | (2006.01) | |
| B32B 27/08 | (2006.01) | |

(52) U.S. Cl.
CPC .......... *G02B 1/16* (2015.01); *B32B 7/12* (2013.01); *B32B 27/08* (2013.01); *B32B 27/30* (2013.01); *B32B 27/306* (2013.01); *B32B 27/308* (2013.01); *C08J 7/047* (2013.01); *C09D 5/24* (2013.01); *C09D 175/04* (2013.01); *G02B 5/30* (2013.01); *G02F 1/133528* (2013.01); *B32B 2255/10* (2013.01); *B32B 2255/26* (2013.01); *B32B 2264/102* (2013.01); *B32B 2270/00* (2013.01); *B32B 2307/202* (2013.01); *B32B 2307/21* (2013.01); *B32B 2307/42* (2013.01); *B32B 2307/518* (2013.01); *B32B 2307/746* (2013.01); *B32B 2457/20* (2013.01); *B32B 2571/00* (2013.01); *C08J 2333/00* (2013.01); *C08J 2400/12* (2013.01); *C08J 2465/00* (2013.01); *C08J 2479/02* (2013.01); *G02F 2202/16* (2013.01)

(58) Field of Classification Search
CPC .......... B32B 27/30; B32B 27/00; B32B 27/42; B32B 27/36; B32B 27/18; B32B 23/04; G02B 5/30; G02B 1/10; G02B 1/16; G02B 5/3058; G02F 1/133528; C08J 7/047; C09D 5/24; C09D 175/04; C09D 175/08
USPC .......... 359/485.05, 507
See application file for complete search history.

(56) References Cited

U.S. PATENT DOCUMENTS

| | | | |
|---|---|---|---|
| 2006/0279842 A1* | 12/2006 | Kim | .......... G02B 5/3058 359/485.05 |
| 2008/0095997 A1 | 4/2008 | Chiang et al. | |
| 2010/0165263 A1 | 7/2010 | Lee et al. | |
| 2012/0164456 A1 | 6/2012 | Seo et al. | |

FOREIGN PATENT DOCUMENTS

| | | |
|---|---|---|
| CN | 101720337 A | 6/2010 |
| JP | 2008-203861 A | 9/2008 |
| JP | 2009-107329 A | 5/2009 |
| JP | 2009-222743 A | 10/2009 |
| JP | 2011-252948 A | 12/2011 |
| JP | 2012-063773 A | 3/2012 |
| JP | 2013-010892 A | 1/2013 |
| JP | 2013-023611 A | 2/2013 |
| KR | 10-2011-0053938 A | 5/2011 |
| TW | 200916314 A | 4/2009 |
| WO | 2009/011227 A1 | 1/2009 |

OTHER PUBLICATIONS

Wikipedia: "Sheet resistance", XP-007910724, Internet Citation url:http://en.wikipedia.org/wiki/Sheet_resistance, Dec. 2009, pp. 1-3.

\* cited by examiner

*Primary Examiner* — Euncha Cherry
(74) *Attorney, Agent, or Firm* — Dentons US LLP

(57) ABSTRACT

The present invention relates to an optical film including an acryl-based film; and a functional coating layer formed on at least one surface of the acryl-based film, containing a conductive material and a water-dispersible resin and having surface resistance of $10^9$ W/Sq to $10^{13}$ W/Sq.

13 Claims, No Drawings

OPTICAL FILM INCLUDING FUNCTIONAL COATING LAYER AND POLARIZING PLATE AND IMAGE DISPLAY DEVICE INCLUDING SAME

This application is a National Phase entry of PCT/KR2014/009055 filed on Sep. 26, 2014 and claims priority to Korean Application Nos. 10-2013-0117064 filed Sep. 30, 2013 and 10-2014-0128311 filed Sep. 25, 2014 in the Korean Intellectual Property Office, all of which are incorporated by reference for all purposes as if fully set forth herein.

TECHNICAL FIELD

The present invention relates to an optical film having a functional coating layer including a conductive material such as a conductive polymer, an ionic liquid or a metal oxide in an acryl-based film, and a polarizing plate and an image display device including the same.

BACKGROUND ART

Existing polarizing plates generally has a structure in which a triacetyl cellulose (hereinafter, TAC) film is laminated on both surfaces of a polyvinyl alcohol (hereinafter, refer to as 'PVA') polarizer.

However, a TAC film is vulnerable to moisture thereby causes a durability problem due to dimensional changes when used for a long period of time, and in order to remedy such a disadvantage, attempts to use a film having a composition with high resistance for moisture and a low phase-difference physical property such as a cyclo-olefin polymer (hereinafter, COP), a polycarbonate (hereinafter, PC) or an acryl-based resin in a polarizing plate have been made. Particularly, a film having an acryl-based composition is known have advantages not only in optical properties and durability, but also in costs.

However, an acryl-based film prepared using existing acryl-based resins has high surface friction, therefore, has a problem in that blocking (a phenomenon of two film surfaces joining and sticking to each other after winding) occurs when winding the film, and adhesion with a polarizer is not satisfactory.

In view of the above, a primer prepared by adding fine particles to a polyurethane polymer has been developed. In this case, a polarizer protective film having an excellent winding property may be prepared by suppressing the blocking occurring during the winding. However, even in this case, static electricity is generated during a process of unwinding a wound film due to high electric insulation of an acryl-based film, which causes a problem of contaminating the surface by foreign substances being adsorbed to the film substrate, and in severe cases, this leads to the generation of sparks threatening the safety of workers. Besides, there is a problem in that, despite a cleaning operation for removing the adsorbed foreign substances, optical defects occur due to the foreign substances still remaining.

Particularly, polarizing plate sizes tend to increase with the recent trend of liquid crystal display device panels becoming larger, and the amount of static electricity generated further increases with processes speeding up for productivity improvement. Accordingly, the development of polarizer protective films having an excellent anti-static effect, and having a function capable of quickly removing generated static electricity has been required.

DISCLOSURE

Technical Problem

In view of the above, an object of the present invention is to provide an acryl-based optical film overcoming static electricity generated in the process of unwinding a wound film and defects occurring therefrom, and securing an anti-static property by providing a functional coating layer including a conductive material in an acryl-based film, and a polarizing plate and an image display device including the same.

Technical Solution

In one aspect, the present invention provides an optical film including an acryl-based film; and a functional coating layer formed on at least one surface of the acryl-based film, containing a conductive material and a water-dispersible resin and having surface resistance of $10^9$ W/Sq to $10^{13}$ W/Sq.

The conductive material is preferably a conductive polymer; an ionic liquid; a metal oxide; or a mixture thereof.

The conductive polymer may be a polythiophene-based, a polypyrrole-based, a polyaniline-based polymer compound or a mixture thereof.

In addition, the metal oxide may be doped zinc oxide (ZnO), doped tin oxide (ATO) or doped indium oxide (ITO).

Furthermore, the ionic liquid may include one or more types selected from the group consisting of a cation formed with alkylimidazolium, alkylphosphonium, N-alkylpyridinium, N,N'-dialkylimidazolium or a derivative thereof; an anion formed with bromide, hexafluorophosphate, hexafluoroantimonite, tetrafluoroborate, difluoromethane sulfate, methane sulfate, tosylate, chloride or a derivative thereof; and a mixture thereof.

The functional coating layer preferably includes the conductive polymer in 1 to 10 parts by weight with respect to 100 parts by weight of the water-dispersible resin, preferably includes the ionic liquid in 5 to 25 parts by weight with respect to 100 parts by weight of the water-dispersible resin, and preferably includes the metal oxide in 0.1 to 10 parts by weight with respect to 100 parts by weight of the water-dispersible resin.

The water-dispersible resin is preferably a water-dispersible polyurethane-based resin, a water-dispersible acryl-based resin or a combination thereof.

In another aspect, the present invention provides a polarizing plate and an image display device including the optical film of the present invention.

Advantageous Effects

An acryl-based film of the present invention provides a functional coating layer including a conductive material on the surface, therefore, has an excellent anti-blocking property and an excellent adhesive property with a polarizer, and in addition to this, has an excellent anti-static property since the amount of static electricity generated during a process of unwinding a wound film is small.

Mode for Disclosure

Hereinafter, preferred embodiments of the present invention will be described. However, embodiments of the present invention may be modified to various other forms, and the scope of the present invention is not limited to the embodiments described below. In addition, embodiments of the present invention are provided in order to more completely describe the present invention for those having average knowledge in the art.

As a result of extensive studies for developing an acryl-based optical film having an excellent anti-static effect without inhibiting optical properties and an adhesive property, the inventors of the present invention have found that an optical film having not only excellent optical properties and an adhesive property, but also an excellent anti-static property, which has been a disadvantage in the art, may be prepared by forming a functional coating layer including a conductive material together with a water-dispersible resin on the surface of an acryl-based film, and completed the present invention.

More specifically, an optical film of the present invention includes an acryl-based film, and a functional coating layer containing a conductive material and a water-dispersible resin on at least one surface of the acryl-based film and having surface resistance of $10^9$ W/Sq to $10^{13}$ W/Sq. Particularly, the conductive material includes a conductive polymer such as a polythiophene-based, a polypyrrole-based and a polyaniline-based polymer, an ionic liquid or a metal oxide.

The functional coating layer of the optical film of the present invention preferably has a surface resistance value of approximately $10^9$ W/Sq to $10^{13}$ W/Sq, and more preferably approximately $10^9$ W/Sq to $10^{12}$ W/Sq. When the value satisfies the above range, winding defects such as winding wrinkles and blocking, which may occur to an optical film, may be effectively improved, and static electricity generated during unwinding the wound acrylic film having high electric insulation may be effectively reduced. In other words, an optical film having an excellent anti-static effect, and capable of quickly removing the generated static electricity may be prepared.

The conductive polymer is used for removing contamination sources such as dust by having an anti-static effect on the coated film. The conductive polymer is preferably a polythiophene-based, a polypyrrole-based, a polyaniline-based polymer compound or a mixture thereof, and preferably has a hydrophilic functional group in the molecule. Examples of the hydrophilic functional group include a sulfo group, an amino group, an amide group, an imide group, a 4-ammonium base, a hydroxyl group, a mercapto group, a hydrazino group, a carboxyl group, a sulfate group or salts thereof.

Herein, although not limited thereto, the polyaniline-based polymer compound commercially available is preferably polyaniline sulfonic acid, and aquaPASS-50Y, which is a trade name of Mitsubishi Rayon, Co., Ltd., and the like, may be used.

Meanwhile, the polymer compound is, although not limited thereto, more preferably a polythiophene-based compound, and polyethylendioxithiophene (PEDOT) is particularly preferable.

Herein, the polymer compound may use commercially available Baytron P or Baytron PH, which is a trade name of Bayer AG. Baytron P is a product adding polystyrene sulfonic acid (PSS) to a water-dispersible liquid, in which polyethylendioxithiophene (PEDOT) is dispersed in water, as a dopant. The content of polyethylendioxithiophene in the Baytron P is approximately 1.4%.

Meanwhile, in the present invention, the functional coating layer includes the conductive polymer in approximately 1 to 10 parts by weight as the solid content with respect to 100 parts by weight of the solid content of the water-dispersible resin, and preferably in approximately 2 to 5 parts by weight. When the content of the conductive polymer is less than 1 parts by weight, an anti-static effect is difficult to be obtained, and when the content is greater than 10 parts by weight, the transparency and coatability of the coating layer are reduced.

Meanwhile, the ionic liquid is called an ionic liquid since it is present as a liquid at a temperature of 100° C. or less, which is different from metal salt compounds formed with common metal cations and nonmetal anions. The ionic liquid is formed with an organic cation and an anion, has almost zero vapor pressure, is fire retardant and ionic, and has low viscosity and high conductivity.

The ionic liquid capable of being used in the present invention is formed with a cation formed with alkylimidazolium, alkylphosphonium, N-alkylpyridinium, N,N'-dialkylimidazolium or a derivative thereof, and the like, and an anion formed with bromide, hexafluorophosphate, hexafluoroantimonite, tetrafluoroborate, difluoromethane sulfate, methane sulfate, tosylate, chloride or a derivative thereof, and the like, and these may be used either alone or as a mixture of two or more types.

Meanwhile, the ionic liquid may use commercially available products. Examples of the commercially available ionic liquid may include IL-OH2, IL-OH8, IL-MA1, IL-MA2 or IL-S8 (KOEI Chemical Co., Ltd.) and the like, but are not limited thereto.

Meanwhile, the ionic liquid in the present invention is included in 5 to 25 parts by weight with respect to 100 parts by weight of the solid content of the water-dispersible resin, and preferably in 10 to 20 parts by weight. When the content of the ionic liquid satisfies the above range, anti-static performance is secured, and when the content is greater than 25 parts by weight, coatability is reduced and adhesive strength tend to decrease.

When using the ionic liquid in an anti-static application, other solvents may be used as necessary for favorable dispersibility. As the solvent, most solvents capable of dissolving a UV-curable resin while dissolving the ionic liquid may be used, and any one or more of ketone-based solvents such as toluene and methylethyl ketone, acetate-based solvents, lower alcohol-based solvents such as methyl alcohol, ethyl alcohol and isopropyl alcohol, aldehyde-based solvents such as dimethylformaldehyde, ether-based solvents such as diethyl ether, dipropyl ether and alcohol ether, amide-based solvents such as N-methyl-2-pyrilidinone, sulfoxide-based solvents such as dimethyl sulfoxide, and amine-based solvents such as alkylamine, cyclic amine and aromatic amine may be selected and used.

Meanwhile, the metal oxide as the conductive material may use metal oxides generally used as an anti-static agent in the art without limit. For example, an oxide of a metal selected from among Ti, Zr, In, Zn, Sn, Sb and Al may be preferably used as the conductive metal oxide. In terms of conductivity, the conductive metal oxide may preferably use an oxide of a metal including at least one of Sb, In and Sn. More preferably, the conductive metal oxide may be doped zinc oxide (ZnO), doped tin oxide (ATO; antimony tin oxide) or doped indium oxide (ITO; indium tin oxide).

An average particle diameter of the metal oxide is preferably 1 nm to 120 nm, more preferably 1 nm to 60 nm, and even more preferably 2 nm to 40 nm. The average particle diameter of the conductive metal oxide being in the above range is preferable since haze is reduced, dispersion stability is excellent, and the particles may be readily widespread to the top when the solvent is volatilized in the drying process.

The conductive metal oxide may be included in approximately 0.1 to 10 parts by weight with respect to 100 parts by weight of the solid content of the water-dispersible resin, and preferably included in approximately 1 to 5 parts by weight. When the content of the conductive metal oxide is less than 0.1 parts by weight by the above criterion, sufficient anti-static performance may not be revealed, and when the content is greater than 10 parts by weight, anti-static performance is excellent, however, there is a disadvantage in that transparency and coatability are reduced.

Next, the functional coating layer of the present invention includes a water-dispersible resin. When a water-dispersible resin is included instead of a solvent-based resin such as above, mechanical property degradation or surface defects caused by solvent erosion do not occur in an acryl-based film having insufficient solvent resistance, and uniform coating may be obtained. In addition, a water-dispersible resin is environmental friendly and does not require separate explosion-proof facilities, therefore in-line coating may be carried out when preparing a film.

Examples of the water-dispersible resin of the present invention may include, but are not limited to, a water-dispersible polyurethane-based resin, a water-dispersible acryl-based resin or a combination thereof.

Meanwhile, in the present invention, the polyurethane-based resin preferably has a weight average molecular weight of 10,000 to 100,000. When the molecular weight is less than 10,000, there is a problem in adhesive strength, and when the molecular weight is greater than 100,000, water dispersibility may be reduced.

In addition, in the present invention, the polyurethane-based resin preferably includes a carboxyl group. When the polyurethane-based resin includes a carboxyl group, dispersibility for water is improved by the formation of an anion unit, and adhesion with a polarizer is enhanced.

The polyurethane-based resin including a carboxyl group may be obtained by, for example, adding and reacting a chain extender having a free carboxyl group to a polyol and a polyisocyanate. The chain extender having a carboxyl group may include dihydroxy carboxylic acid, dihydroxy succinic acid and the like. Examples of the dihydroxy carboxylic acid may be dialkylol alkanoic acid including dimethylol alkanoic acid such as dimethylol acetic acid, dimethylol butanoic acid, dimethylol propionic acid, dimethylol butyric acid and dimethylol pentanoic acid. These may use either alone or as a combination of two or more types.

In addition, the polyurethane-based resin is obtained by reacting a polyol and a polyisocyanate. The polyol is not particularly limited as long the polyol has two or more hydroxyl groups in the molecule, and any suitable polyol may be employed. Examples of the polyol may include polyester polyol, polycarbonatediol, polyether polyol and the like, and at least one type selected from the group consisting of these may be used either alone or as a combination of two or more types.

Herein, the polyester polyol may be typically obtained by reacting a dibasic acid component and a polyol component. Examples of the dibasic acid component may include aromatic dicarboxylic acids such as ortho-phthalic acid, isophthalic acid, terephthalic acid, 1,4-naphthalene dicarboxylic acid, 2,5-naphthalene dicarboxylic acid, 2,6-naphthalene dicarboxylic acid, biphenyl dicarboxylic acid and tetrahydrophthalic acid; aliphatic dicarboxylic acids such as oxalic acid, succinic acid, malonic acid, glutaric acid, adipic acid, pimelic acid, suberic acid, azelaic acid, sebacic acid, linoleic acid, maleic acid, fumaric acid, mesaconic acid and itaconic acid; alicyclic dicarboxylic acids such as hexahydrophthalic acid, tetrahydrophthalic acid, 1,3-cyclohexane dicarboxylic acid and 1,4-cyclohexane dicarboxylic acid; or reactive derivatives such as acid anhydrides, alkyl esters and acid halides thereof. These may be used either alone or as a combination of two or more types.

Meanwhile, the polyol is preferably at least one type selected from the group consisting of ethylene glycol, 1,2-propanediol, 1,3-propanediol, 1,3-butanediol, 1,4-butanediol, neopentyl glycol, pentanediol, 1,6-hexanediol, 1,8-octanediol, 1,10-decanediol, 4,4'-dihydroxyphenylpropane, 4,4'-dihydroxymethylmethane, diethylene glycol, triethylene glycol, polyethylene glycol, dipropylene glycol, polytetramethylene glycol, polypropylene glycol, 1,4-cyclohexanedimethanol, 1,4-cyclohexanediol, bisphenol A, bisphenol F, glycerin, 1,1,1-trimethylolpropane, 1,2,5-hexatriol, pentaerythritol, glucose, sucrose, and sorbitol.

The polycarbonatediol is preferably an aliphatic polycarbonatediol. A polyurethane-based resin synthesized using such an aliphatic polycarbonatediol has excellent mechanical properties, and has excellent water resistance and oil resistance as well, and particularly has excellent long-term weather resistance. Meanwhile, examples of the aliphatic polycarbonatediol may include, but are not limited to, one or more types selected from the group consisting of poly(hexamethylenecarbonate)glycol and poly(cyclohexane carbonate) glycol.

The polyether polyol may be typically obtained by adding alkylene oxide to a polyol by ring opening polymerization. Examples of the polyol may include ethylene glycol, diethylene glycol, propylene glycol, dipropylene glycol, glycerin, trimethylolpropane and the like. These may be used either alone or as a combination of two or more types.

Meanwhile, the polyisocyanate is not limited as long as it is a compound having two or more NCO groups, however, for example, either one or a combination of two or more types from the group consisting of toluene diisocyanate (TDI), 4,4-diphenylmethan diisocyanate (MDI), 1,5-naphthalene diisocyanate (NDI), tolidine diisocyanate (TODI), hexamethylene diisocyanate (HMDI), isoprone diisocyanate (IPDI), p-phenylene diisocyanate, 1,4-diisocyanate and xylene diisocyanate (XDI) may be used.

A method for preparing the polyurethane-based resin may employ any suitable method known in the art. Specifically, a one-shot method reacting each of the components at once, and a multi-stage method reacting each of the components in stages may be used. The polyurethane-based resin is preferably prepared using a multi-stage method when the polyurethane-based resin has a carboxyl group, and this is due to the fact that the carboxyl group may be readily introduced using a multi-stage method. Furthermore, any suitable urethane reaction catalyst may be used when preparing the polyurethane-based resin.

In the preparation of the polyurethane-based resin, other polyols and/or other chain extenders may be reacted in addition to the components described above.

Examples of the other polyols may include a polyol having three or more hydroxyl groups such as sorbitol, glycerin, trimethyolethane, trimethylolpropane and pentaerythritol.

Examples of the other chain extenders may include glycols such as ethylene glycol, diethylene glycol, triethylene glycol, 1,3-propanediol, 1,3-butanediol, 1,4-butanediol, neopentyl glycol, pentanediol, 1,6-hexanediol and propylene glycol; aliphatic diamines such as ethylenediamine, propylenediamine, hexamethylenediamine, 1,4-butanediamine and aminoethylethanolamine; alicyclic diamines such as isophorone diamine and 4,4'-dicyclohexylmethanediamine; and aromatic diamines such as xylylenediamine and tolylenediamine, and the like.

Furthermore, a neutralizing agent may be used in the preparation of the polyurethane-based resin. Stability of the polyurethane-based resin in water may be improved by using a neutralizing agent. Examples of the neutralizing agent may include ammonia, N-methylmorpholine, triethylamine, dimethylethanolamine, methyldiethanolamine, triethanolalkyne, morpholine, tripropylamine, ethanolamine, triisopropanolamine and the like. These may be used either alone or as a combination of two or more types.

When preparing the polyurethane-based resin, an organic solvent inert to the polyisocyanate and having compatibility for water is preferably used. Examples of the organic solvent may include an ester-based solvent such as ethyl acetate and ethyl cellosolve acetate; a ketone-based solvent such as acetone, methylethyl ketone and methylisobutyl ketone; an ether-based solvent such as dioxane and tetrahydrofuran. These may be used either alone or as a combination of two or more types.

Next, a water-dispersible acryl-based resin capable of being used as the water-dispersible resin may be prepared by polymerizing an acryl-based monomer, and herein, using an acryl-based monomer having a glass transition temperature higher than room temperature is preferable. Examples thereof may include, but are not limited to, methyl methacrylate, ethyl methacrylate, isobutyl methacrylate or a mixture thereof, and the like.

In addition, the water-dispersible resin may further include one or more types of acryl-based monomers having a glass transition temperature lower than room temperature. In this case, adhesive strength and physical properties of the functional coating layer may be improved, and examples thereof may include, but are not limited to, methoxyethylamino acrylate, butyl acrylate, hexyl acrylate, ethylhexyl acrylate or a mixture thereof, and the like.

Furthermore, the water-dispersible resin may further include at least one or more types of water-soluble acryl-based monomers. In this case, storage stability of the acryl-based monomer is improved, and examples thereof may include, but are not limited to, hydroxyhexyl acrylate, hydroxyethylacrylamide, methacrylic acid or a mixture thereof, and the like.

Meanwhile, the functional coating layer of the present invention may further include water-dispersible fine particles. In this case, any suitable fine particle may be used as the water-dispersible fine particles, and for example, inorganic-based fine particles, organic-based fine particles or a combination thereof may be used. Examples of the inorganic-based fine particles may include an inorganic oxide including silica-based, titania-based, alumina-based, zirconia-based, antimony-based, and the like. Examples of the organic-based fine particles include a silicone-based resin, a fluorine-based resin, a (meth)acryl-based resin, cross-linked polyvinyl alcohol, a melamine-based resin and the like.

Meanwhile, an optical film of the present invention uses an acryl-based film as a substrate film. The acryl-based film may contain a (meth)acrylate-based resin. The film including a (meth)acrylate-based resin may be prepared by, for example, extrusion molding a molding material containing the (meth)acrylate-based resin as a main component.

The acryl-based film may be a film including copolymer including an alkyl (meth)acrylate-based unit and a styrene-based unit, and an aromatic-based resin having a carbonate part in the main chain, or may be a film including an alkyl (meth)acrylate-based unit, a styrene-based unit, at least one 3 to 6 membered-heteroring unit substituted with a carbonyl group, and a vinyl cyanide unit. In addition, an acryl-based resin having a lactone ring structure may be included.

Specific examples of the (meth)acrylate-based resin having a lactone ring structure may include a (meth)acrylate-based resin having a lactone ring structure disclosed in Japanese Patent Application Laid-Open Publication No. 2000-230016, Japanese Patent Application Laid-Open Publication No. 2001-151814 and Japanese Patent Application Laid-Open Publication No. 2002-120326, and the like.

Examples of the (meth)acrylate-based resin having an aromatic ring may include a resin composition disclosed in the Korean Patent Application Laid-Open Publication No. 10-2009-0115040 including a (a) (meth)acrylate-based unit including one or more types of (meth)acrylate-based derivatives; an (b) aromatic-based unit including a chain having a hydroxyl group-containing unit, and an aromatic unit; and a (c) styrene-based unit including one or more types of styrene-based derivatives. The (a) to (c) units may be each included in the resin composition as a separate copolymer form, or included in the resin composition with two or more units of the (a) to (c) units as one copolymer form.

A method for preparing the (meth)acrylate-based resin film is not particularly limited, and for example, the (meth)acrylate-based film may be prepared by preparing a thermoplastic resin composition by sufficiently mixing a (meth)acrylate-based resin, other polymers, additives and the like using any suitable mixing method, and then molding the result to a film, or the (meth)acrylate-based film may be prepared by preparing a (meth)acrylate-based resin, other polymers, additives and the like as a separate solution, then forming a uniformly mixed solution by mixing the separately prepared solutions, and molding the result to a film.

The thermoplastic resin composition may be prepared by, for example, pre-blending the film raw materials using any suitable mixer such as an omni mixer, and then extrusion kneading the obtained mixture. In this case, the mixer used in the extrusion kneading is not particularly limited, and for example, any suitable mixer including an extruder such as a monoaxial extruder and a biaxial extruder, a pressurized kneader, and the like, may be used.

Examples of the film molding method may include any suitable film molding methods such as a solution casting method, a melting extrusion method, a calendar method and an extrusion molding method. A melting extrusion method is particularly preferable.

The melting extrusion method is not particularly limited, and melting extrusion methods well known in the art may be used. For example, a T-die method, an inflation method and the like may be used. Herein, the molding temperature is preferably 150 to 350° C., and more preferably 200 to 300° C.

When a film is molded using the T die method, the film having a roll shape may be obtained by mounting a T die at the front end of a known monoaxial extruder or a biaxial extruder, and winding the film extruded to a film shape. Herein, the film may be monoaxially oriented by applying orientation in the extrusion direction by properly adjusting the temperature using an orientation roll. In addition, the film may be simultaneous biaxially oriented, sequential biaxially oriented and the like by orienting the film in the perpendicular direction to the extrusion direction using a transverse orientation device such as a tenter.

The acryl-based film may be any one of an unoriented film or an oriented film. When the acryl-based film is an oriented film, it may be either a monoaxially oriented film or a biaxially oriented film, and when the acryl-based film is a biaxially oriented film, it may be any one of a simultaneous biaxially oriented film or a sequential biaxially oriented film. Film performances are improved when the film is biaxially oriented since mechanical strength is improved.

Meanwhile, when other thermoplastic resins are mixed in the orientation during the preparation of the acryl-based film, optical isotropy may be maintained by suppressing the increase in the phase difference, and on the contrary, when a phase difference adjusting agent having high anisotropy is added in the orientation during the preparation of the acryl-based film, phase difference significantly increases, and the film may also be used as a compensation film for a wide viewing angle.

The optical film of the present invention may be prepared using a method of applying a composition for forming a functional coating layer on the surface of such an acryl-based film described above, and then drying the result, and herein, the application may be carried out using methods well known in the art, for example, methods using a bar coater, a gravure coater or a slot die coater.

Herein, surface treatment may be carried out on at least one surface of the acryl-based film in order for improving adhesive strength between the acryl-based film and the functional coating layer, and herein, the surface treatment may use methods well known in the art such as corona treatment or plasma treatment.

Meanwhile, the drying may be carried out through a convection oven and the like, but the method is not limited thereto, and the drying is preferably carried out for 10 seconds to 5 minutes at a temperature of 90° C. to 120° C. The drying temperature may be adjusted differently depending on the steps of the coating.

More specifically, when the optical film of the present invention is an unoriented film or a film completed with orientation before a coating step, the drying may be preferably carried out in a temperature range that does not exceed a glass transition temperature (Tg) of the film.

Meanwhile, when the optical film of the present invention is oriented after coating, orientation may be carried out after drying the film for 10 seconds to 3 minutes at a temperature of to 120° C. after coating, or drying may be carried out simultaneously with orientation at an orientation temperature.

Herein, when orientation and drying are simultaneously carried out, the orientation temperature is preferably a glass transition temperature of the acryl-based resin composition of the present invention (Tg)° C. to (Tg+30)° C., and more preferably (Tg+2)° C. to (Tg+20)° C. Herein, when the orientation temperature is less than Tg, the optical film may break in the orientation step of the optical film, and when the orientation temperature is greater than (Tg+30)° C., the flow of the resin composition occurs and the optical film may not be stably oriented.

Meanwhile, in the present invention, the thickness of the functional coating layer is preferably 50 nm to 2000 nm, more preferably 100 nm to 1000 nm, and even more preferably 200 nm to 700 nm. When the thickness of the functional coating layer is less than 50 nm, there is a problem in that adhesive strength is not sufficient, and when the thickness is greater than 2000 nm, sufficient drying may not be obtained.

In addition, the optical film of the present invention preferably has internal haze of 0.5% or less. Internal haze occurs due to light scattering of the fine particles inside and the like, and as the haze value increases, light transmittance of the prepared polarizing plate may decrease. Accordingly, when an optical film having a large internal haze value is used for LCD panels, a contrast ratio may significantly decrease, therefore, the optical film of the present invention preferably has internal haze of 0.5% or less, and more preferably 0.3% or less.

In addition, the present invention provides a polarizing plate including the optical film of the present invention described above. The polarizing plate may be formed by laminating the optical film having the functional coating layer of the present invention on one or both surfaces of a polarizer.

Herein, the polarizer is not particularly limited, and polarizers well known in the art, for example, films formed with polyvinyl alcohol (PVA) including iodine or dichroic dye may be used. The polarizer may be prepared by dyeing a PVA film with iodine or dichroic dye, however, the preparation method is not particularly limited. In the present specification, a polarizer means a state not including a protective film, and a polarizing plate means a state including a polarizer and a protective film.

A method of laminating a polarizer and the optical film is not particularly limited, and adhesives or glues well known in the art may be used.

In addition, it is preferable that the polarizing plate of the present invention may additionally have a gluing layer for facilitating lamination to liquid crystal cells and the like, and the gluing layer may be disposed on one or both surfaces of the polarizing plate. After adhesion, the glue preferably has mechanical strength improved to the level of an adhesive by sufficient curing with heat or ultraviolet light, and preferably has gluing strength such that both films to which the gluing agent is attached are not detached without one of them being destroyed due to high interface gluing strength.

Gluing agents capable of being used preferably has excellent optical transparency, a proper wetting property, a proper aggregating property or a gluing property equal to an adhesive property. Specific examples include glues properly prepared with polymers such as an acryl-based polymer, a silicone-based polymer, polyester, polyurethane, polyether and synthetic rubber as a base polymer may be included.

Herein, the polarizing plate including the optical film according to the present invention has reduced static electricity generated during the polarizing plate manufacturing process due to an excellent anti-static effect of the optical film having the functional coating layer of the present invention, and as a result, a polarizing plate having minimal occurrence of foreign substances and defects may be obtained.

Furthermore, the present invention provides an image display device including the optical film or the polarizing plate provided with the functional coating layer according to the descriptions made above. In other words, the polarizing plate of the present invention may be favorably used for an image display device by being attached to one or both surfaces of an image panel. The image panel may include liquid crystal panels, plasma panels and organic light emitting panels, and accordingly, the image display device may include liquid crystal display devices (LCD), plasma display devices (plasma display panel, PDP) and organic electroluminescent display devices (organic light emitting diode, OLED).

More specifically, the image display device may include a liquid crystal display device including a liquid crystal panel, and polarizing plates each provided on both surfaces of this liquid crystal panel, and herein, at least one of the polarizing plates may be the polarizing plate according to the present invention.

Herein, the types of the liquid crystal panel included in the liquid crystal display device are not particularly limited. For example, known panels including panels using a passive matrix method such as a twisted nematic (TN) type, a super twisted nematic (STN) type, a ferroelectric (F) type or a polymer dispersed (PD) type; panels using an active matrix method such as a two terminal type or a three terminal type; and an in plane switching (IPS) panel and a vertical alignment (VA) type panel may all be used without being limited by the types. In addition, types of other constitutions forming a liquid crystal display device such as upper and lower substrates (ex. color filter substrate or array substrate) are not particularly limited as well, and constitutions known in the art may be employed without limit.

Hereinafter, the present invention will be described in more detail with reference to examples.

EXAMPLE 1

After an unoriented film having a width of 800 mm was prepared with a poly(cyclohexylmaleimide-co-methyl methacrylate) (LG MMA PMMA830HR) resin using a T-die film-forming apparatus under a condition of 250° C. and 250 rpm, the film was oriented by 1.8 times in an MD direction at a temperature of 135° C.

An anti-static functional coating solution was prepared by mixing 4.67 g of a water-dispersible polyurethane-based resin (Chokwang Paint Ltd., CK-PUD-PF: aqueous solution having 30% solid content), 2 g of a conductive material (PEDOT/PSS, aqueous solution having 1.4% solid content) and 13.33 g of pure water.

An optical film was prepared by coating the functional coating solution prepared above on the acryl-based film oriented in an MD direction using a #5 Mayer bar, and then orienting the result by 2.0 times in a TD direction for 1 min at a temperature of 135° C.

EXAMPLE 2

An optical film was prepared in the same manner as in Example 1 except that 3 g of the conductive material (PEDOT/PSS, aqueous solution having 1.4% solid content) was used when preparing the functional coating solution.

EXAMPLE 3

An optical film was prepared in the same manner as in Example 1 except that 1.40 g of polyaniline sulfonic acid (PAS, Mitsubishi Rayon, Co., Ltd., aqueous solution having 3.0% solid content) was used as the conductive material instead of PEDOT/PSS (aqueous solution having 1.4% solid content) when preparing the functional coating solution.

EXAMPLE 4

An optical film was prepared in the same manner as in Example 1 except that 2.33 g of polyaniline sulfonic acid (PAS, Mitsubishi Rayon, Co., Ltd., aqueous solution having 3.0% solid content) was used as the conductive material instead of PEDOT/PSS (aqueous solution having 1.4% solid content) when preparing the functional coating solution.

EXAMPLE 5

An optical film was prepared in the same manner as in Example 1 except that 0.21 g of an ionic liquid (IL-OH8, KOEI Chemical Co., Ltd.) was used as the conductive material instead of PEDOT/PSS (aqueous solution having 1.4% solid content) when preparing the functional coating solution.

EXAMPLE 6

An optical film was prepared in the same manner as in Example 1 except that 4.67 g of an acryl-based resin (TAKAMATSU OIL & FAT Co. Ltd., A-645: aqueous solution having 30% solid content) was used instead of the water-dispersible polyurethane-based resin (Chokwang Paint Ltd., CK-PUD-PF: aqueous solution having 30% solid content) when preparing the functional coating solution.

EXAMPLE 7

An optical film was prepared in the same manner as in Example 2 except that 4.67 g of an acryl-based resin (TAKAMATSU OIL & FAT Co. Ltd., A-645: aqueous solution having 30% solid content) was used instead of the water-dispersible polyurethane-based resin (Chokwang Paint Ltd., CK-PUD-PF: aqueous solution having 30% solid content) when preparing the functional coating solution.

EXAMPLE 8

An optical film was prepared in the same manner as in Example 5 except that 4.67 g of an acryl-based resin (TAKAMATSU OIL & FAT Co. Ltd., A-645: aqueous solution having 30% solid content) was used instead of the water-dispersible polyurethane-based resin (Chokwang Paint Ltd., CK-PUD-PF: aqueous solution having 30% solid content) when preparing the functional coating solution.

Comparative Example 1

After an unoriented film having a width of 800 mm was prepared with a poly(cyclohexylmaleimide-co-methyl methacrylate) (LG MMA PMMA830HR) resin using a T-die film-forming apparatus under a condition of 250° C. and 250 rpm, the film was oriented by 1.8 times in an MD direction at a temperature of 135° C.

An optical film was prepared by orienting the film prepared above by 2.0 times in a TD direction for 1 min at a temperature of 135° C. without a process of preparing and coating an anti-static functional coating solution as in Example 1.

Comparative Example 2

An optical film was prepared in the same manner as in Example 1 except that a coating solution was prepared by mixing 4.67 g of a water-dispersible polyurethane-based resin (Chokwang Paint Ltd., CK-PUD-PF: aqueous solution having 30% solid content) and 13.33 g of pure water and coating the solution on the oriented film.

Comparative Example 3

An optical film was prepared in the same manner as in Example 1 except that 15 g of a conductive material (PEDOT/PSS, aqueous solution having 1.4% solid content) was used when preparing the functional coating solution.

Comparative Example 4

An optical film was prepared in the same manner as in Example 1 except that 1 g of a conductive material (PEDOT/

PSS, aqueous solution having 1.4% solid content) was used when preparing the functional coating solution.

Comparative Example 5

An optical film was prepared in the same manner as in Example 1 except that 0.43 g of an ionic liquid (IL-OH8, KOEI Chemical Co., Ltd.) was used as the conductive material instead of PEDOT/PSS (aqueous solution having 1.4% solid content) when preparing the functional coating solution.

Comparative Example 6

An optical film was prepared in the same manner as in Example 1 except that 0.014 g of an ionic liquid (IL-OH8, KOEI Chemical Co., Ltd.) was used as the conductive material instead of PEDOT/PSS (aqueous solution having 1.4% solid content) when preparing the functional coating solution.

Test Example

1. Surface Resistance 3 points on the surface of the prepared anti-static optical film were measured for 3 times each using a surface resistance measuring device (MCP-HT450/MITSUBUSHI CHEMICAL) and Probe (URS, UR100), and the average value was calculated. The results are shown in the following Table 1.

2. Evaluation on Coatability

The surface of the 20 cm×20 cm film prepared in Examples 1 to 8 and Comparative Examples 2 to 6 was observed, and the degree of the coated exterior defects such as overall stains, bar pattern stains, spot-type stains and Dewetting marks was evaluated. The results are shown in the following [Table 1].

○ (favorable): defect region area was less than 1%.
Δ (moderate): defect region area was greater than or equal to 1% and less than 10%.
x (poor): defect region area was 10% or greater.

3. Evaluation on Adhesive Strength

A 2 cm×2 cm polarizing plate prepared by laminating the film prepared in Examples 1 to 8 and Comparative Examples 1 to 6, a PVA polarizer and another protective film using an adhesive was pulled out with 0.05 N and 0.5 cm/sec for 6 seconds using a texture analyzer, and adhesive strength between the prepared acryl-based film and the PVA was determined by the degree of the destruction of the acrylic substrate film. The measurement results are shown in the following [Table 1]. (Herein, the acryl-based film being destroyed means that the PVA polarizer and the primer completely adhere.)

○ (favorable): the destroyed area of the acrylic substrate film on the adhesion surface was 50% or greater.
Δ (moderate): the destroyed area of the acrylic substrate film on the adhesion surface was 50% or less.
x (poor): the destroyed area of the acrylic substrate film on the adhesion surface was none.

4. Anti-Blocking Property

A film roll was formed by slitting both ends of the prepared film, and then winding 500 m or greater of the film in a roll. Wound status of the film, and changes in the roll appearances and the like after the roll was left unattended for 1 week or longer were identified by visual observation, and an anti-blocking property was evaluated as follows. The measurement results are shown in the following [Table 1].

○ (favorable): film was wound without wrinkles, and no changes in the appearances were observed or there was no adhesion between the films after being left attended for 1 week or longer.
x (poor): wrinkles occurred when the film was wound, or changes in the appearances were observed, or there was adhesion between the films after being left attended.

TABLE 1

| | | Conductive Material Composition | | Physical Properties | | | |
|---|---|---|---|---|---|---|---|
| Category | Film | Water-dispersible Resin | Conductive Material | Surface Resistance (W/Sq) | Coatability | Adhesive Strength | Anti-blocking Property |
| Example 1 | Acryl | Polyurethane | PEDOT 2 Parts by Weight | $10^{12}$ to $10^{13}$ | ○ | ○ | ○ |
| Example 2 | Acryl | Polyurethane | PEDOT 3 Parts by Weight | $10^{11}$ | ○ | ○ | ○ |
| Example 3 | Acryl | Polyurethane | PAS 3 Parts by Weight | $10^{13}$ | ○ | ○ | ○ |
| Example 4 | Acryl | Polyurethane | PAS 5 Parts by Weight | $10^{12}$ | ○ | ○ | ○ |
| Example 5 | Acryl | Polyurethane | IL-OH8 15 Parts by Weight | $1.5 \times 10^{12}$ | ○ | Δ | ○ |
| Example 6 | Acryl | Acryl-based Resin | PEDOT 2 Parts by Weight | $10^{12}$ to $10^{13}$ | ○ | Δ | ○ |
| Example 7 | Acryl | Acryl-based Resin | PEDOT 3 Parts by Weight | $10^{11}$ | ○ | Δ | ○ |
| Example 8 | Acryl | Acryl-based Resin | IL-OH8 15 Parts by Weight | $10^{12}$ | ○ | Δ | ○ |

TABLE 1-continued

| Category | Film | Conductive Material Composition | | Physical Properties | | | |
| | | Water-dispersible Resin | Conductive Material | Surface Resistance (W/Sq) | Coatability | Adhesive Strength | Anti-blocking Property |
|---|---|---|---|---|---|---|---|
| Comparative Example 1 | Acryl | — | — | $>10^{15}$ | — | x | x |
| Comparative Example 2 | Acryl | Polyurethane | — | $>10^{15}$ | ○ | ○ | ○ |
| Comparative Example 3 | Acryl | Polyurethane | PEDOT 15 Parts by Weight | $10^{10}$ | x | x | ○ |
| Comparative Example 4 | Acryl | Polyurethane | PEDOT 1 Parts by Weight | $>10^{15}$ | ○ | ○ | ○ |
| Comparative Example 5 | Acryl | Polyurethane | IL-OH8 30 Parts by Weight | $10^{11}$ to $10^{12}$ | Δ | x | ○ |
| Comparative Example 6 | Acryl | Polyurethane | IL-OH8 1 Parts by Weight | $>10^{15}$ | ○ | Δ | ○ |

When comparing Examples 1 to 8 and Comparative Example 1 of Table 1, it was seen that the acryl-based film including the functional coating layer according to the present invention had more superior surface resistance compared to the acryl-based film that does not include the functional coating layer, thereby had an excellent anti-static property. In addition, when examining Comparative Examples 3 to 6, it was identified that when the content of the conductive polymer was outside the proper content range described in the present invention, coatability and adhesive strength were reduced.

Hereinbefore, examples of the present invention have been described in detail, however, claims of the present invention are not limited thereto, and it will be apparent to those skilled in the art that various modifications and changes may be made without departing from the spirit of the present invention described in the claims.

The invention claimed is:

1. An optical film comprising:
   an acryl-based film; and
   a functional coating layer formed on at least one surface of the acryl-based film, containing a conductive material and a water-dispersible resin, and having surface resistance of $10^9$ W/Sq to $10^{13}$ W/Sq,
   wherein the water-dispersible resin is a water-dispersible polyurethane-based resin, a water-dispersible acryl-based resin or a combination thereof.

2. The optical film of claim 1, wherein the conductive material is a conductive polymer; an ionic liquid; a metal oxide; or a mixture thereof.

3. The optical film of claim 2, wherein the conductive polymer is a polythiophene-based, a polypyrrole-based, a polyaniline-based polymer compound or a mixture thereof.

4. The optical film of claim 2, wherein the metal oxide is doped zinc oxide (ZnO), doped tin oxide (ATO) or doped indium oxide (ITO).

5. The optical film of claim 2, wherein the ionic liquid includes one or more types selected from the group consisting of a cation formed with alkylimidazolium, alkylphosphonium, N-alkylpyridinium, N,N'-dialkylimidazolium or a derivative thereof; an anion formed with bromide, hexafluorophosphate, hexafluoroantimonite, tetrafluoroborate, difluoromethane sulfate, methane sulfate, tosylate, chloride or a derivative thereof; and a mixture thereof.

6. The optical film of claim 2, wherein the functional coating layer includes the conductive polymer in 1 to 10 parts by weight with respect to 100 parts by weight of the water-dispersible resin.

7. The optical film of claim 2, wherein the functional coating layer includes the ionic liquid in 5 to 25 parts by weight with respect to 100 parts by weight of the water-dispersible resin.

8. The optical film of claim 2, wherein the functional coating layer includes the metal oxide in 0.1 to 10 parts by weight with respect to 100 parts by weight of the water-dispersible resin.

9. The optical film of claim 1, wherein a weight average molecular weight of the polyurethane-based resin is 10,000 to 100,000.

10. The optical film of claim 1, wherein the polyurethane-based resin includes a carboxyl group.

11. The optical film of claim 1, which is a protective film for a polarizing plate.

12. A polarizing plate comprising the optical film of claim 11.

13. An image display device comprising the polarizing plate of claim 12.

* * * * *